United States Patent [19]

Kobayashi

[11] 4,345,287
[45] Aug. 17, 1982

[54] WORD LINE NUMBER COUNT/DISPLAY DEVICE FOR TAPE RECORDER

[75] Inventor: Minoru Kobayashi, Hachioji, Japan

[73] Assignee: Olympus Optical Co., Ltd., Tokyo, Japan

[21] Appl. No.: 161,316

[22] Filed: Jun. 20, 1980

[30] Foreign Application Priority Data

Jun. 26, 1979 [JP] Japan .................................. 54-80334

[51] Int. Cl.³ ............................................. G11B 5/008
[52] U.S. Cl. .................................................... 360/137
[58] Field of Search ......................................... 360/137

[56] References Cited

U.S. PATENT DOCUMENTS

| | | | |
|---|---|---|---|
| 4,044,233 | 8/1977 | Sato | 360/137 |
| 4,140,896 | 2/1979 | Robertson | 360/137 |
| 4,167,787 | 9/1979 | Satoh et al. | 360/137 |
| 4,172,231 | 10/1979 | d'Alayer de Costemore d'Arc et al. | 360/137 |
| 4,208,686 | 6/1980 | Sato et al. | 360/137 |
| 4,214,282 | 7/1980 | Sato et al. | 360/137 |
| 4,217,615 | 8/1980 | Suzuki | 360/137 |

*Primary Examiner*—Robert S. Tupper
*Attorney, Agent, or Firm*—Frishauf, Holtz, Goodman and Woodward

[57] ABSTRACT

A word line number count/display device for a tape recorder for dictation comprises a magnetic head which detects a second and a third cue signals from a magnetic recording tape driven in either one or the other direction and produces detection signals corresponding to both cue signals. The detection signals are received by a time measuring circuit which measures the period of time elapsed from the reception of the detection signal corresponding to either one of the cue signals till the reception of the detection signal corresponding to the other cue signal to produce a time period signal corresponding to the length of the measured time period. The time period signals are divided by a predetermined reference value corresponding to a predetermined period of time to produce a quotient signal. The quotient signal is multiplied by a predetermined value obtained by dividing the number of words spoken during the predetermined period of time by an average number of words contained in one line of a typing paper used by a typist to produce a product signal. The product signal is changed to a digital signal by a decoder and is transferred to a digital display device for displaying digital information corresponding to the digital signal.

8 Claims, 5 Drawing Figures

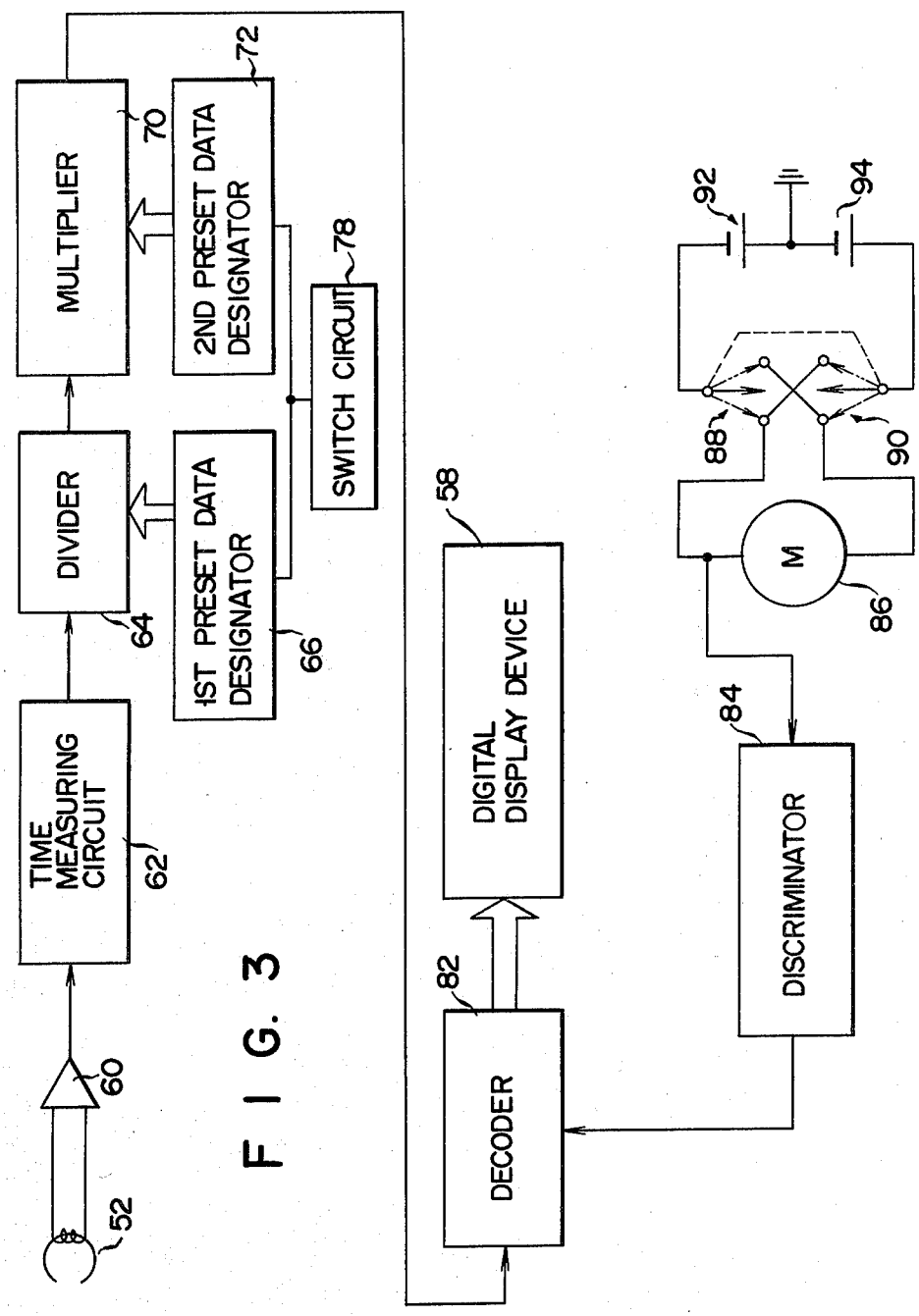
F I G. 3

WORD LINE NUMBER COUNT/DISPLAY DEVICE FOR TAPE RECORDER

BACKGROUND OF THE INVENTION

This invention relates to a word line number count/display device, which is used with a tape recorder for dictation using a multi-channel magnetic head and counts and displays the number of word lines of the essential portion or main communication content of dictated information recorded on a magnetic recording tape.

In the prior-art tape recorder for dictation using a multi-channel magnetic head, at the time of recording, a message containing a remark or the like regarding the main communication content is recorded before the recording of the main communication content which is the essential portion of the dictation. Also, at the time of the recording, a first cue signal is recorded on the tape immediately before the recording of the message and also a second cue signal different from the first is recorded on the tape immediately before and after the recording of the main communication content for the purpose of facilitating discrimination between the message and main communication content at playback. At this time, the message and main communication content are recorded on the magnetic recording tape by one of two magnetic heads or a first magnetic head of the multi-channel magnetic head, while the first and second cue signals are recorded on the tape by the other or a second magnetic head of the multi-channel magnetic head.

During playback of the tape, on which the message and main communication content as well as the first and second cue signals are recorded in the above way, the first and second cue signals are reproduced by the second magnetic head while the message and main communication content are reproduced by the first magnetic head. With the prior-art tape recorder, however, the number of words of the main communication content cannot be told before the typing operation. Therefore, it is impossible to know before the typing operation the number of word lines which are required for typing the main communication content on a typing sheet having a predetermined width. This means that it sometimes happens that it is found after the typing operation that it is impossible to write a signature on the sheet where the last portion of the main communication content is typed so that the signature alone has to be written on a separate sheet. Also it sometimes happens that the signature has to be written on a sheet where only the last portion few lines of the main communication portion is typed.

SUMMARY OF THE INVENTION

An object of the invention is to provide a word line number count/display device, which is used for a tape recorder for dictation having a multi-channel magnetic head and counts and displays the number of word lines of the main communication content recorded on a magnetic recording tape.

BRIEF DESCRIPTION OF THE DRAWINGS

FIG. 3 is a block diagram showing an embodiment of the word line number count/display device according to the invention;

DETAILED DESCRIPTION OF THE PREFERRED EMBODIMENTS

Figure 1:
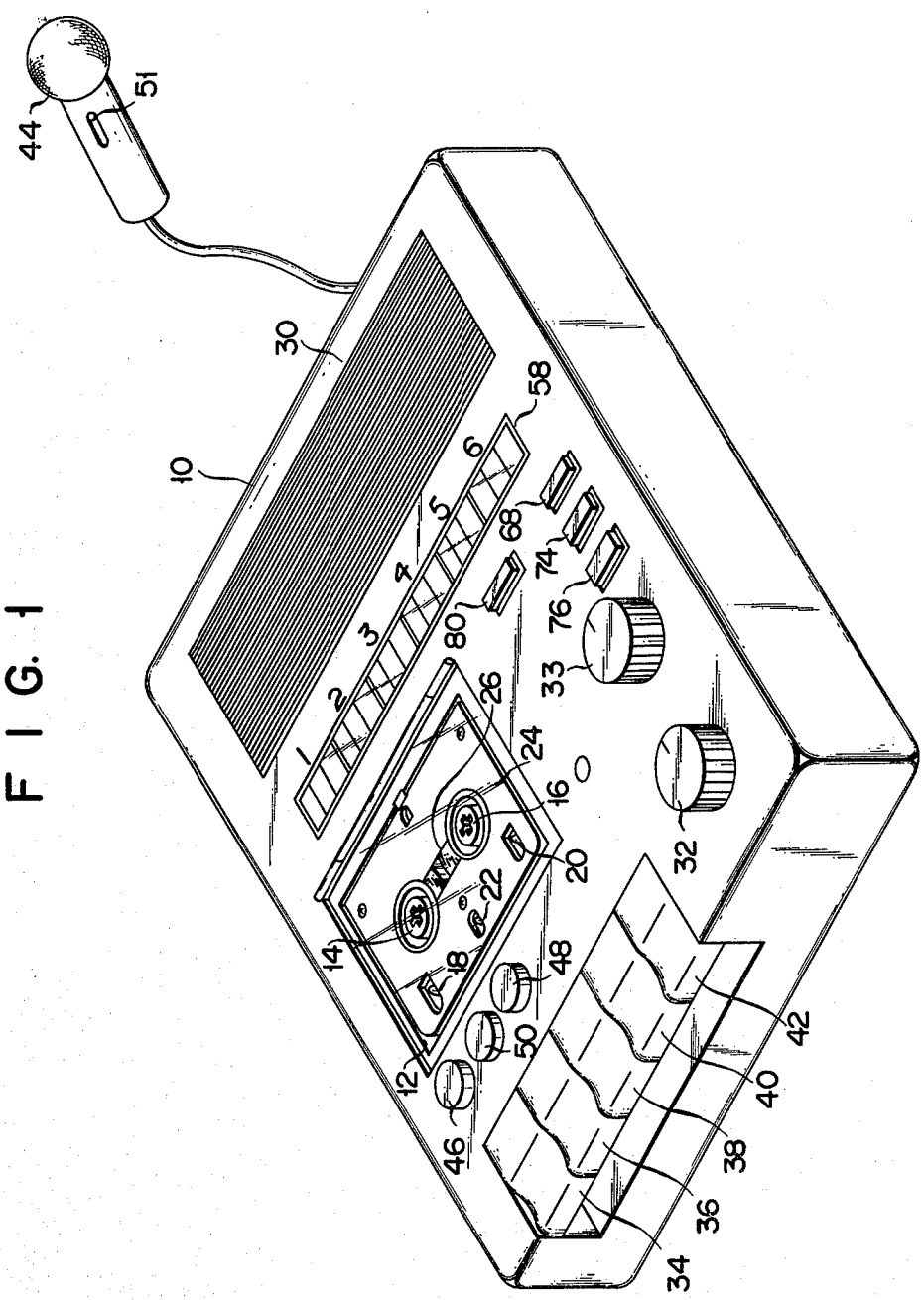
FIG. 1 is a perspective view showing a tape recorder for dictation provided with an embodiment of the word line number count/display device according to the invention.

FIG. 1 shows a tape recorder 10 for dictation provided with a word line number count/display device according to the invention. The tape recorder 10 is provided at its top with a tape cassette loading section 12. In the tape cassette loading section 12, a pair of reel shafts 14 and 16, a pair of cassette positioning pins 18 and 20 and a capstan 22 project from its bottom. A tape cassette 24 is loaded in a tape cassette loading section 12. The pair of reel shafts 14 and 16 project through respective reel hubs provided in the housing of the tape cassette 24. The cassette positioning pins 18 and 20 and capstan 22 respectively project through cassette positioning pin holes and a capstan hole formed in the housing of the tape cassette 24. In the housing of the tape cassette 24, a magnetic recording tape 26 is wound on the pair of reel hubs. The cassette loading section 12 is provided in its side wall with an opening (not shown), in which a multi-channel magnetic head (not shown), a pinch roller (not shown) and a magnetic head for erasure (not shown) are provided. In this embodiment, the multi-channel magnetic head includes two magnetic heads. The tape cassette loading section 12 is covered by a tape cassette lid.

The tape recorder 10 is also provided at its top with a loudspeaker 30, a volume control knob 32 for controlling the volume of the sound reproduced from the loudspeaker 30 and a tone control knob 33 for controlling the tone of the reproduced sound. The top of the tape recorder 10 is further provided with a stop/eject button 34, a forward play button 36, a record button 38, a fast forward●cue button 40 and a rewind●cue button 42. When the forward play●cue button 36 is depressed, the multi-channel magnetic head and pinch roller are brought into contact with the magnetic recording tape 26 accommodated in the tape cassette 24 loaded in the tape cassette loading section 12. The magnetic recording tape 26 is driven in a predetermined direction at a constant speed by the pinch roller and capstan 22 and the pair of reel shafts 14 and 16. At this time, one of the magnetic heads in the multi-channel magnetic head converts magnetic signals which have been recorded on the magnetic recording tape 26 into electric signals, which are coupled to the loudspeaker 30. When the record button 38 is depressed together with the forward play button 36, the magnetic head for erasure is brought into contact with the tape 26, while the afore-mentioned one magnetic head in the multi-channel magnetic head converts electric signals from a microphone 44 into magnetic signals and records them on the tape 26 which is driven in the predetermined direction at the constant speed.

When the fast forward•cue button 40 is depressed, the pinch roller and magnetic head for erasure are separated from the tape 26, and the multi-channel magnetic head alone is left in contact with the tape 26. At this time, the tape 26 is driven in the afore-mentioned predetermined direction and at a speed faster than the afore-mentioned constant speed by the pair of reel shafts 14 and 16. Also, the afore-mentioned one magnetic head in the multi-channel magnetic head converts magnetic signals which have been recorded on the tape 26 into electric signals and supplies them to the loudspeaker 30.

When the rewind•cue button 42 is depressed, the pinch roller and magnetic head for erasure are separated from the tape 26, and only the multi-channel magnetic head is held in contact with the tape 26. At this time, the tape 26 is driven in the direction opposite to the afore-mentioned predetermined direction at a speed faster than the afore-mentioned constant speed. Also, the afore-mentioned one magnetic head in the multi-channel magnetic head converts magnetic signals which have been recorded on the tape 26 into electric signals and supplies them to the loudspeaker 30.

When the stop/eject button 34 is depressed after the forward play button 36 or the forward play button 36 and record button 38 or the fast foward•cue button 40 or the rewind•cue button 42 is or are depressed, the pinch roller, magnetic head for erasure and multi-channel magnetic head are separated from the tape 26. At this time, the tape 26 is also stopped. When the stop-/eject button 34 is depressed once again, that is, when it is depressed twice in succession, the cassette lid is brought to its open position, and the tape cassette 24 is ejected from the tape cassette loading section 12.

The top of the tape recorder 10 is further provided with first and second cue signal addition buttons 46 and 48 and a pause button 50.

When the first cue signal addition button 46 is depressed after the forward play button 36 and record button 38 are depressed, the other magnetic head in the multi-channel magnetic head records a first cue signal at a first predetermined frequency, 60 Hz in this embodiment, on the tape 26.

When the second cue signal addition button 48 is depressed after the forward play button 36 and record button 38 are depressed, the other magnetic head in the multi-channel magnetic head records a second or third cue signal at a second predetermined frequency, 120 Hz in this embodiment, on the tape 26.

When the pause button 50 is depressed after the forward play button 36 or the forward play button 36 and record button 38 or the fast foward•cue button 40 or the rewind•cue button 42 is or are depressed, the tape 26 is stopped while the pinch roller and multi-channel magnetic head or the pinch roller, multi-channel magnetic head and magnetic head for erasing remain in contact with the tape 26. The microphone 44 is provided with an auxiliary pause button 51 which has the same function as the pause button 50 only when the microphone 44 is coupled to the tape recorder 10.

Figure 2:
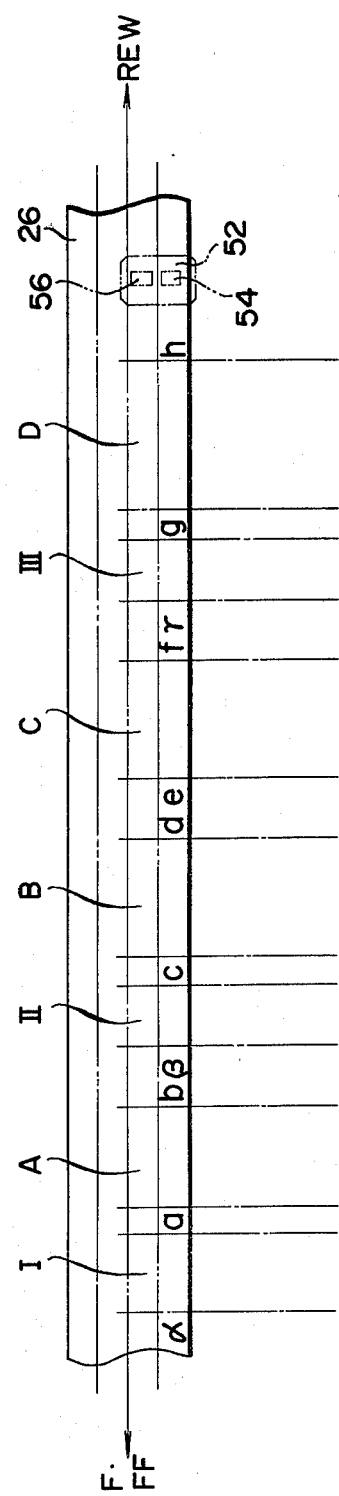
FIG. 2 is an elevational view showing a magnetic recording tape, on which first, second and third cue signals as well as the message and main communication content of letters are recorded using the tape recorder shown in FIG. 1.

The function of the tape recorder 10 will be described in further detail with reference to FIG. 2 which is an enlarged-scale view showing part of the magnetic recording tape 26 accommodated in the tape cassette 24. Designated at 52 in FIG. 2 is the multi-channel magnetic head provided in the tape recorder 10.

The dictator first depresses the forward play button 36 and record button 38 and immediately thereafter depresses the first cue signal addition button 46. At this time, the afore-mentioned other magnetic head, designated at 54 in FIG. 2, of the multi-channel magnetic head 52 records a first cue signal indicated by symbol "α" on the tape 26 driven in a direction shown by arrow F•FF at the constant speed. When a dictation containing such content as the address of a letter is given to the microphone 44 after depressing the first cue signal addition button 46, it is recorded on a portion of the tape 26 indicated by symbol "I" by the afore-mentioned one magnetic head, designated at 56 in FIG. 2, of the multi-channel magnetic head 52. When the dictation is ended, the second cue signal addition button 48 is depressed. At this time, the other magnetic head 54 records a second cue signal indicated by symbol "a" on the tape 26.

When a dictation of, for instance, the main communication content of the first letter is given to the microphone 44 after depressing the second cue signal addition button 48, it is recorded on a portion of the tape 26 indicated by symbol "A" by the head 56. When the dictation of the main communication content is ended, the second cue signal addition button 48 is depressed. At this time, the other head 54 records a third cue signal indicated by symbol "b" on the tape 26.

The dictator then depresses the first cue signal addition button 46. At this time, the other head 54 records a first cue signal indicated by symbol "β" on the tape 26. When a dictation, for instance containing an alteration of the afore-mentioned main communication content or such content as the addresses of second and third letters, is given to the microphone 44, it is recorded on a portion of the tape 26 indicated by symbol "II" by the head 56. When this dictation is ended, the second cue signal addition button 48 is depressed. At this time, the other head 54 records a second signal indicated by symbol "c" on the tape 26.

When dictation, for instance containing the main communication content of the second letter, is commenced after depressing the second cue signal addition button 48, it is recorded on a portion of the tape 26 indicated by symbol "B" by the head 56. When this dictation is ended, the second cue signal addition button 48 is depressed. At this time, the other head 54 records a third cue signal indicated by symbol "d" on the tape 26. Immediately afterwards, the second cue signal addition button 48 is depressed once again. At this time, the other head 54 records the second cue signal indicated by symbol "e" on the tape 26. When a dictation of the main communication content of the third letter is commenced immediately afterwards, it is recorded on a portion of the tape 26 indicated by symbol "c" by the head 56. When this dictation is ended, the second cue signal addition button 48 is depressed. At this time, the head 54 records a third cue signal indicated by symbol "f" on the tape 26.

The dictator then depresses the first cue signal addition button 46. At this time, the other head 54 records a first cue signal indicated by symbol "γ" on the tape 26. When a dictation, for instance containing such content as cancellation of the third letter or the address of a fourth letter, is commenced, it is recorded on a portion of the tape 56 indicated by symbol "III" by the head 56. When this dictation is ended, the second cue signal addition button 48 is depressed. At this time, the other head 54 records a second cue signal indicated by symbol "g" on the tape 26.

When a dictation, for instance containing the main communication content of the fourth letter, is commenced after depressing the second cue signal addition button 48, it is recorded on a portion of the tape 26 indicated by symbol "D" by the head 56. When this dictation is ended, the second cue signal addition button 48 is depressed. At this time, the other head 54 records a third cue signal indicated by symbol "h" on the tape 26.

The top of the tape recorder 10 is provided with a digital display unit 58 of the word line number count/display device embodying the invention.

The main component parts of the word line number count/display device are accommodated within the housing of the tape recorder 10.

As shown in FIG. 3, the word line number count/display device is provided with the other magnetic head 52 of the multi-channel magnetic head 52 as a detecting means for detecting the second and third cue signals a, b, c, d, e, f, g and h from the magnetic recording tape 26 and producing detection signals corresponding to the detected second and third cue signals. The head 52 is electrically connected to an amplifier 60, and when it detects the second and third cue signals it transmits electrical detection signals to the amplifier 60. The amplifier 60 is electrically connected to a time measuring circuit 62. It measures the period of time elapsed from the reception of an electrical signal corresponding to one of the second and third cue signals a, b, c, d, e, f, g and h till the reception of an electrical signal corresponding to another one of the second and third cue signals. It is electrically connected to a divider 64. The divider 64 divides the electrical time period signal produced from the time measuring circuit 62 by a predetermined reference value corresponding to a predetermined period of time and produces an electrical quotient signal corresponding to the quotient value. To the divider 64 is electrically connected a first preset data designator 66 which is a reference value setting means for setting the afore-mentioned predetermined reference value corresponding to a predetermined period of time. It includes a time setting button 68 as shown in FIG. 1, provided on the top of the tape recorder 10, for setting the predetermined period of time. In this embodiment, the predetermined period of time is one minute.

The divider 64 is electrically connected to a multiplier 70. The multiplier 70 multiplies the electrical quotient signal from the divider 64 by a predetermined value, which is the quotient of division of the number of words spoken by the dictator during the afore-mentioned predetermined period of time by the average number of words contained in one line of the typing paper used by the typist, to produce a product signal corresponding to the result of multiplication. To the multiplier 70 is electrically connected a second preset data designator 72 which is a value setting means for setting the afore-mentioned predetermined value. The second preset data designator 72 includes a dictation word number setting button 74 as shown in FIG. 1, provided on the top of the tape recorder 10, for setting the number of words spoken by the dictator during the afore-mentioned predetermined period of time. It also includes a typing word number setting button 76 as shown in FIG. 1, provided on the top of the tape recorder 10, for setting the average number of typed words contained in one line of the typing paper used by the typist. In the instant embodiment, the dictation word number is set to 120, and the average typing word number is set to 50, so that the afore-mentioned predetermined quotient value is 120/50=2.4.

As shown in FIG. 3, the first and second preset data designators 66 and 72 are electrically connected to a switch circuit 78. The switch circuit 78 includes a reset button 80 as shown in FIG. 1, provided on the top of the tape recorder 10, for operating the first and second preset data designators 66 and 72. Thus, the predetermined period of time cannot be set in the first preset data designator 66 by depressing the time setting button 68 unless the reset button 80 has been previously depressed. Also, neither of the dictation word number, i.e., the number of words spoken by the dictator during the afore-mentioned predetermined period of time and the average typing word number, i.e., the average number of typed words contained in one line of the typing paper used by the typist, can be set in the second preset data designator 72 by depressing the dictation word number setting button 74 or the typing word number setting button 76 unless the reset button 80 has been previously depressed. Thus, it is possible to prevent the change of the predetermined time period, dictation word number or average typing word number at the time when the time setting button 68, dictation word number setting button 74 or typing word number setting button 76 is depressed by mistake.

As shown in FIG. 3, the multiplier 70 is electrically connected to a decoder 82. The decoder 82 produces a digital signal corresponding to the product signal from the multiplier 70.

The decoder 82 is electrically connected to a digital display device 58 as shown in FIG. 1. In this embodiment, the digital display device 58 has eighteen 7-segment-type LEDs or LCDs. The eighteen LEDs or LCDs form six display units each consisting of three LEDs or LCDs. In the digital display device 58, one of these display units is used for displaying a digital value corresponding to the digital signal from the decoder 82.

To the decoder 82 is electrically connected a discriminator 84 which is a permutation circuit means. The discriminator 84 is electrically connected to one of the pair terminals of a DC motor 86, which is provided in the housing of the tape recorder 10 for driving the pair of reel shafts 14 and 16 thereof. The DC motor 86 is rotatable in one and the other direction at a uniform speed and with the same characteristic. Its pair terminals are electrically connected to respective three-position switches 88 and 90. One of the three-position switches, namely switch 88, is electrically connected to the anode of a first direct current power supply 92, in this embodiment a battery accommodated in the housing of the tape recorder 10. The other three-position switch 90 is electrically connected to the cathode of a second direct current power supply 94, in this embodiment a battery accommodated in the housing of the tape recorder 10. The cathode of the first direct current power supply 92 is electrically connected to the anode of the second power supply 94 and is also grounded. The pair of three-position switches 88 and 90 are mechanically ganged to the stop/eject button 34, forward play button 36, fast forward•cue button 40, rewind•cue button 42, pause button 50 and auxiliary pause button 51 of the tape recorder 10.

The pair of three-position switches 88 and 90 are normally in a first position as shown by solid arrows in FIG. 3. At this time, the DC motor 86 is not supplied with direct current from the first and second direct current power supplies 92 and 94 so that it is not rotated. When the forward play button 36 or fast forward•cue button 40 is depressed, the pair of three-position switches 88 and 90 are simultaneously brought to a second position as shown by one-dot chain line arrows in FIG. 3. At this time, the DC motor 86 is rotated in one direction at a constant speed to cause rotation of the pair of reel shafts 14 and 16 in one direction at the same time. As a result, the magnetic recording tape 26 is driven in the direction of arrow F•FF in FIG. 2. When the rewind•cue button 42 is depressed, the pair of three-position switches 88 and 90 are simultaneously brought to a third position as shown by two-dot chain line arrows in FIG. 3. At this time, the DC motor 86 is rotated in the other direction at the constant speed to cause rotation of the pair reel shafts 14 and 16 at the same time. As a result, the tape 26 is driven in the direction of arrow REW in FIG. 2. When the pause button 50 or auxiliary pause button 51 is depressed after the forward play button 36, fast forward•cue button 40 or rewind•cue button 42 has been depressed, the pair of three-position switches 88 and 90 are brought from the third or second position to the first position.

The discriminator 84 produces a logic level output corresponding to the potential on one of the terminals of the DC motor 86. The decoder 82 in this embodiment comprises a bilateral shift register, in which the direction of shift is changed according to the logic level output of discriminator 84. More particularly, when the DC motor 86 is rotated in one direction, i.e., in the direction to drive the magnetic recording tape 26 in the direction of arrow F•FF in FIG. 2, the bilateral shift register supplies digital values from the decoder 82 in the order of their arrival and in a predetermined arrangement to the digital display device 58 for display thereon. On the other hand, when the DC motor 86 is rotated in the other direction, i.e., in the direction to drive the tape 26 in the direction of arrow REW in FIG. 2, the bilateral shift register supplies digital values from the decoder 82 in the order of their arrival and in an arrangement converse to the afore-mentioned predetermined arrangement to the digital display device 58 for display thereon.

Figure 4:
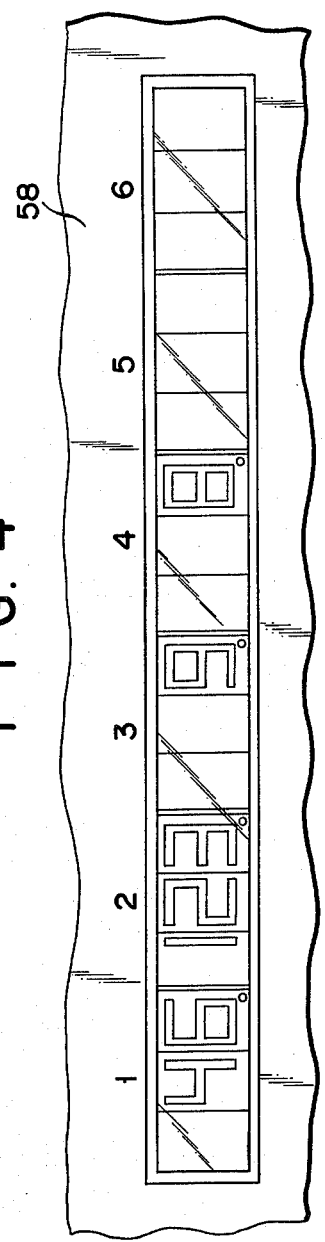
FIG. 4 is an enlarged-scale view showing a digital display device shown in FIG. 1, with numbers of word lines of the main communication content of first to fourth letters, counted by one embodiment of the word line number count/display device according to the invention from a magnetic recording tape driven in one direction by the tape recorder shown in FIG. 1, being orderly displayed by first to fourth display units of the display device.

With the word line number count/display device embodying the invention as described above, when the magnetic recording tape is driven in the direction of arrow F•FF in FIG. 2, the number of word lines on the typing paper used in typing by the typist, for instance those for the main communication content of the first to fourth letters, is orderly displayed on the digital display device 58, for instance in the first to fourth display units thereof as shown in FIG. 4.

Figure 5:
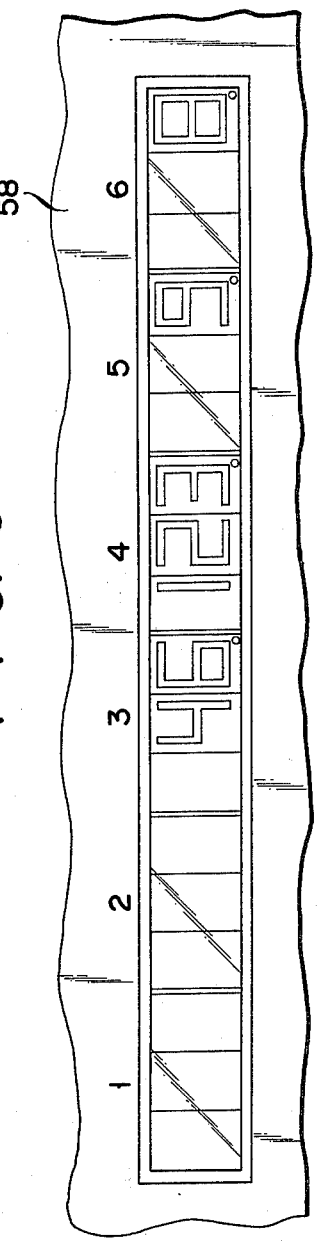
FIG. 5 is a view similar to FIG. 4 but with numbers of word lines of the main communication content of the fourth to first letters, counted by one embodiment of the word line number count/display device according to the invention from the tape driven in the other direction by the tape recorder of FIG. 1, being orderly displayed by sixth to third display units of the display device.

Also, when the tape is driven in the direction of arrow REW, the number of word lines on the typing paper used by the typist, for instance those for the main communication content of the fourth to first letters, is orderly displayed on the digital display device 58, for instance in the sixth to third display units thereof as shown in FIG. 5.

As has been described in the foregoing, the word line number count/display device according to the invention comprises a detecting means for detecting the second and third cue signals from the magnetic recording tape driven in either one or the other direction and producing detection signals corresponding to the detected second and third cue signals, a time measuring circuit means electrically connected to the detecting means and for receiving the detection signals and measuring the period of time elapsed from the reception of the detection signal corresponding to either one of the second and third cue signals till the reception of the detection signal corresponding to the other one of the second and third cue signals to produce a time period signal corresponding to the length of the measured time period, a dividing circuit means electrically connected to the time measuring circuit means and for dividing the time period signal from the time measuring circuit means by a predetermined reference value corresponding to a predetermined period of time to produce a quotient signal corresponding to the quotient of the division, a multiplying circuit means electrically connected to the dividing circuit means and for multiplying the quotient signal from the dividing circuit means by a predetermined value obtained by dividing the number of words spoken by a dictator during the afore-mentioned predetermined period of time by an average number of words contained in one line of a typing paper used by a typist to produce a product signal corresponding to the product of the multiplication, a decoder electrically connected to the multiplying circuit means and for producing a digital signal corresponding to the product signal from the multiplying circuit means, and a digital display means electrically connected to the decoder and for displaying digital information corresponding to the digital signal. Thus, the number of word lines of the main communication content of the dictation recorded on the magnetic recording tape can be counted and displayed.

In the word line number count/display device, the detecting means is preferably a magnetic head.

Also, in the word line number count/display device, the dividing circuit means preferably includes a reference value setting means for setting the predetermined reference value corresponding to the predetermined period of time.

Further, in the word line number count/display device, the multiplying circuit means preferably includes a value setting means for setting the number of words spoken during the predetermined period of time and the average number of words contained in one word line of the typing paper.

Still further, in the word line number count/display device, the afore-mentioned predetermined reference value in the dividing circuit is preferably one minute.

Yet further, in the word line number count/display device, the decoder preferably includes a permutation circuit means electrically connected to the digital display means and for causing the display of the digital information in the order of arrival thereof and in a predetermined arrangement on the digital display means when the magnetic recording tape is being driven in the afore-mentioned one direction and also causing the display of the digital information in the order of arrival thereof and in an arrangement converse to the predetermined arrangement on the digital display means when the magnetic recording tape is being driven in the afore-mentioned other direction.

The above embodiment is given for the purpose of illustration only and is by no means limitative, and various changes and modifications in technical details can be made without departing from the scope and spirit of the invention.

What is claimed is:

1. In a tape recorder for dictation, comprising a multi-channel magnetic head including a plurality of magnetic heads; means for driving a magnetic recording tape in either one or the other direction; means coupled to one magnetic head of said multi-channel magnetic head for recording a dictation containing such information as a main communication content and a message or remark concerning said main communication content on said magnetic recording tape when said tape is being driven in said one direction; and means coupled to another magnetic head of said multi-channel magnetic head for recording, when said tape is being driven in said one direction, a first cue signal on said tape immediately before the recording of said message or remark, a second cue signal different from said first cue signal on said tape immediately before the recording of said main communication content, and a third cue signal of the same kind as said second cue signal on said tape immediately after the recording of said main communication content;

the improvement comprising a word line number count/display device comprising:

detecting means for detecting said second and third cue signals from said magnetic recording tape while it is being driven in either said one or the other direction and for producing detection signals corresponding to said detected second and third cue signals;

time measuring circuit means electrically connected to said detecting means for receiving said detection signals and for measuring the period of time elapsed from the reception of the detection signal corresponding to either one of said second and third cue signals till the reception of the detection signal corresponding to the other one of said second and third cue signals to produce a time period signal corresponding to the length of the measured time period;

dividing circuit means electrically connected to said time measuring circuit means for dividing said time period signal by a predetermined reference value corresponding to a predetermined period of time to produce a quotient signal corresponding to the quotient of the division;

multiplying circuit means electrically connected to said dividing circuit means for multiplying said quotient signal by a predetermined value obtained by dividing the number of words spoken during the afore-said predetermined period of time by an average number of words contained in one line of a typing paper used by a typist to produce a product signal corresponding to the product of the multiplication;

decoder means electrically connected to said multiplying circuit means for producing a digital signal corresponding to said product signal; and digital display means electrically connected to said decoder for displaying digital information corresponding to said digital signal.

2. The tape recorder according to claim 1, wherein said detecting means is a magnetic head.

3. The tape recorder according to claim 2, wherein said dividing circuit means includes a reference value setting means for setting said predetermined reference value corresponding to said predetermined period of time.

4. The tape recorder according to claim 3, wherein said predetermined reference value in said dividing circuit means corresponds to one minute.

5. The tape recorder according to claim 1, wherein said multiplying circuit means includes a value setting means for setting the number of words spoken by a dictator during said predetermined period of time and the average number of words contained in one word line of said typing paper.

6. The tape recorder according to claim 3, wherein said multiplying circuit means includes a value setting means for setting the number of words spoken by a dictator during said predetermined period of time and the average number of words contained in one word line of said typing paper.

7. The tape recorder according to claim 6, wherein said predetermined reference value in said dividing circuit means corresponds to one minute.

8. The tape recorder according to any one of claims 1, 2, 3, 4, 5, 6 or 7, wherein said decoder includes a permutation circuit means electrically connected to said digital display means for causing the display of said digital information in the order of arrival thereof and in a predetermined arrangement on said digital display means when said magnetic recording tape is being driven in said one direction, and for also causing the display of said digital information in the order of arrival thereof and in an arrangement converse to said predetermined arrangement on said digital display means when said magnetic recording tape is being driven in said other direction.

* * * * *